United States Patent
Hofacker et al.

(10) Patent No.: US 6,884,501 B2
(45) Date of Patent: Apr. 26, 2005

(54) PLASTICS STABILIZED WITH ZINC OXIDE-CONTAINING, ABRASION-RESISTANT MULTILAYERS

(75) Inventors: Steffen Hofacker, Butzbach (DE); Michael Mager, Leverkusen (DE); Hermann-Jens Womelsdorf, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/829,684

(22) Filed: Apr. 10, 2001

(65) Prior Publication Data

US 2001/0044020 A1 Nov. 22, 2001

(30) Foreign Application Priority Data

Apr. 14, 2000 (DE) .................................. 100 18 429

(51) Int. Cl.$^7$ .......................... B32B 5/16; B32B 27/36; B32B 13/04; B32B 27/08; B32B 27/00
(52) U.S. Cl. ..................... 428/323; 428/332; 428/412; 428/446; 428/447; 428/474.4; 428/477.7; 428/500; 428/908.8
(58) Field of Search .................. 428/323, 332, 428/412, 446, 447, 474.4, 477.7, 500, 908.8, 402, 403, 405, 688, 689, 702

(56) References Cited

U.S. PATENT DOCUMENTS

| | | | | |
|---|---|---|---|---|
| 5,677,410 A | | 10/1997 | Mager et al. | 528/15 |
| 5,747,152 A | * | 5/1998 | Oka et al. | 428/323 |
| 5,880,305 A | | 3/1999 | Kraus et al. | 556/459 |
| 5,925,453 A | * | 7/1999 | Kase et al. | 428/323 |
| 6,106,605 A | * | 8/2000 | Basil et al. | 106/287.12 |
| 6,319,594 B1 | * | 11/2001 | Suzuki et al. | 428/208 |

FOREIGN PATENT DOCUMENTS

| | | |
|---|---|---|
| DE | 199 07 704 | 8/2000 |
| EP | 0 763 581 | 3/1997 |
| WO | 00/27931 | 5/2000 |
| WO | 00/55656 | 9/2000 |

OTHER PUBLICATIONS

Database Caplus 'Online! Chemical Abstracts Service, Columbus, Ohio, US; Li Haoying: "Preparation of organic–inorganic multifunctional nanocomposite coating via sol–gel routes." Database accession No. 2001:803211 XP002217690 Zusammenfassung & Journal Of Nanoparticle Research Bd. 3, Nr. 2–3, 2001, Seiten 157–160.

Patent Abstracts of Japan vol. 1996, No. 10, Oct. 31, 1996 & JP 08 165145 A (Tonen Corp), Jun. 25, 1996 Zusammenfassung & Database Caplus 'Online! Chemical Abstracts Service, Columbus, Ohio, US; 1996:583526, 1996 Zusammenfassung.

Patent Abstracts of Japan vol. 1995, No. 7, Aug. 31, 1995 & JP 07 097535 A (Sumitomo Osaka Cement Co Ltd; Others: 01), Apr. 11, 1995 Zusammenfassung.

Patent Abstracts of Japan vol. 1995, No. 07, Aug. 31, 1995 & JP 2000 007996 A (Hitachi Ltd), Jan. 11, 2000 Zusammenfassung.

* cited by examiner

*Primary Examiner*—Sheeba Ahmed
(74) *Attorney, Agent, or Firm*—Joseph C. Gil; Thomas W. Roy

(57) ABSTRACT

The invention relates to a plastic article with a coating containing at least one zinc oxide-containing layer and at least one abrasion-resistant outer layer.

6 Claims, 1 Drawing Sheet

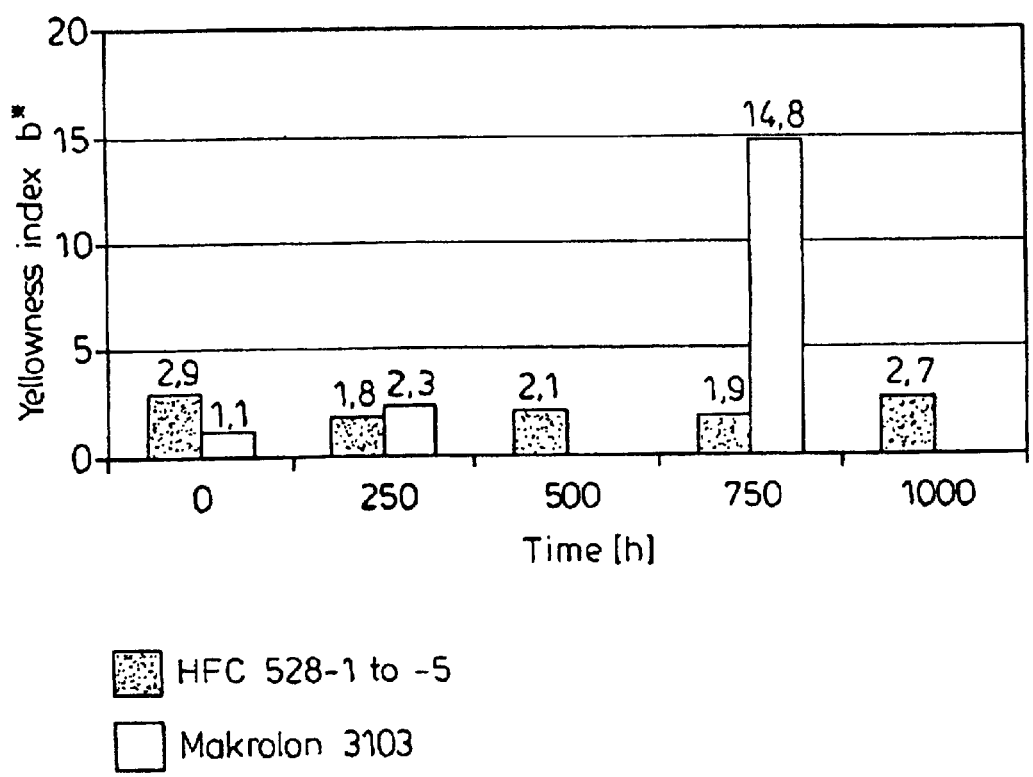

PLASTICS STABILIZED WITH ZINC OXIDE-CONTAINING, ABRASION-RESISTANT MULTILAYERS

BACKGROUND OF THE INVENTION

Field of the Invention

The invention relates to plastics which are stabilized with zinc oxide-containing, abrasion-resistant multilayers.

Many plastics have to be protected with a suitable UV absorber for outdoor use, to prevent degradation. This may be achieved, for example, by adding UV absorbers to the total volume of plastics material. It is also possible to protect the plastics with a coating containing UV absorbers, which coating may be applied for example by means of coextrusion or by a wet-chemical method.

Plastics may generally be effectively protected by using organic UV absorbers. However, when subjected to very long-term UV radiation (e.g. sunlight), organic UV absorbers are themselves slowly degraded and thus lose their protective action. Furthermore, the effects of weather (moisture, elevated temperatures) may result in UV absorber loss due to migration and leaching out.

On the other hand, inorganic UV absorbers, such as zinc oxide for example, do not exhibit the above-mentioned disadvantages of organic UV absorbers. Moreover, if the particle size of the zinc oxide (nano ZnO) used is sufficiently small, highly transparent layers may be produced therefrom. The production of such zinc oxide nano particles is described, for example, in German patent application DE 19907704.5.

If, in addition to protection from UV radiation, the plastics material needs also to be protected against mechanical damage, this may be achieved by the application of an abrasion-resistant coating. In particular where glass is replaced by plastics such as polycarbonate, extreme levels of abrasion resistance are required. Some coatings have previously been described which meet these stringent requirements. Examples may be found in U.S. Pat. No. 5,677,410, DE-A 196 03 241, WO 98/52992, EP-A 947 520, DE-A 45 38 361 and EP-A 0 263 428. However, the incorporation of zinc oxide into these coatings is often problematic, since it may lead to a reduction in abrasion-resistance. In addition, inadequate compatibility may also result in aggregation or agglomeration of the zinc oxide nano particles in the coating, leading to cloudiness. If the coating solutions contain acidic catalysts (which is the case with many sol-gel solutions), zinc oxide is dissolved and no longer contributes to UV protection.

An object of the present invention is to provide plastics which exhibit durable protection against UV radiation and an abrasion-resistant surface, wherein the above-mentioned disadvantages encountered in the production of coatings are avoided.

It has now surprisingly been found that it is possible to produce plastics with the above-mentioned properties by using a multilayer structure containing of at least one ZnO-containing layer and at least one abrasion-resistant layer.

SUMMARY OF THE INVENTION

The present invention relates to a plastic article with a coating containing at least one zinc oxide-containing layer and at least one abrasion-resistant outer layer.

BRIEF DESCRIPTION OF THE DRAWINGS

FIG. 1 sets forth QUV-A weathering data for coated plastic articles according to the invention.

DETAILED DESCRIPTION OF THE INVENTION

ZnO nano particles with particle sizes <30 nm may be used as the ZnO sources. Preferred ZnO nano particle preparations are those which may be mixed directly with the coating solution and/or at least one of the components of the coating solution without the occurrence of flocculation or other segregation phenomena. The use of ZnO nano particles described in German patent application DE-A 19907704.5 is particularly preferred.

In the context of the invention, abrasion-resistant coatings are those which, after scratching with a Taber Abrader (ISO 3537, 1000 cycles, 500 g load per wheel, CS-10-F abrasive media), exhibit scattered light on the scratch track (to ASTM D 1003) of less than 20%, preferably less than 10% more preferably less than 5%. In comparison, commercially available polycarbonate (Makrolon from Bayer AG) exhibits scattered light greater than 30% on the scratch track after only 100 cycles of the Taber Abrader test.

Examples of abrasion-resistant coatings are, in particular, heat- or radiation-curing sol-gel materials. Such sol-gel materials are generally based on condensates of low-molecular weight organoalkoxysilanes and/or organosilanols, which may be cured by further condensation and/or polymerisation (in the case of unsaturated or epoxy-functional organosilyl residues) on the substrate to yield highly abrasion-resistant coatings. Such sol-gel materials are described repeatedly in the literature, for example in U.S. Pat. No. 5,677,410, DE-A 196 03 241, WO 98/52992, EP-A 947 520, DE-A 45 38 361 and EP-A 0 263 428.

In the context of the invention, zinc oxide-containing coatings are those which, in addition to a suitable binder, preferably contain zinc oxide particles with a primary particle size of from 1 to 30 nm, such that no noteworthy scattering or absorption is observed in the visible light range. Binders particularly suitable for zinc oxide are those which exhibit only a slight or no tendency towards photooxidative decomposition. The coatings contain from 1 to 50 wt. % zinc oxide.

The simplest multilayer structure according to the invention on the plastics a zinc oxide-containing layer and an abrasion-resistant outer layer. However, further layers may also be applied.

In one embodiment of the present invention, zinc oxide-containing and abrasion-resistant surfaces are obtained in that initially a zinc oxide-containing layer is applied to the substrate and readily volatile constituents such as solvents are optionally evaporated. The abrasion-resistant coating is then applied with or without further curing and is finally heat- or radiation-cured.

In a further embodiment of the present invention, the surface of the substrate is treated chemically with a coupling agent or physically (plasma, corona) prior to application of the zinc oxide-containing layer in order to achieve improved adhesion. It is also possible, however, to use the coupling agent itself as a binder for the zinc oxide particles, thereby avoiding the need for an additional coating stage.

It is additionally possible to deposit the abrasion-resistant layer of the multilayer structure according to the invention from the gas phase in the form of a pure or predominantly inorganic layer. The latter may contain for example $SiO_2$, $TiO_2$, $Al_2O_3$ or mixtures thereof. In this way, abrasion resistance may be further increased and/or anti-reflective action may be improved.

Surface modification of nanocrystalline zinc oxide in aqueous dispersion is possible with various organosilanes. The organosilane must contain at least one condensation-crosslinking residue. Examples of such residues are alkoxy residues, in particular methoxy or ethoxy residues, silanols or acetoxy residues. The organic residue of the organosilane may be aliphatic, aromatic or optionally aliphatically or aromatically substituted. Examples of such organosilanes include methyltriethoxysilane or 3-glycidoxypropyltrimethoxysilane.

In one embodiment of the present invention, surface modification of nano zinc oxide in aqueous dispersion proceeds by the addition of organosilane (pure or dissolved in a suitable solvent) and stirring of the reaction mixture at temperatures of between 15° C. and 100° C. To prevent agglomeration, it may also be preferable to perform the reaction in the presence of ultrasound.

The ratio of organosilane and nano zinc oxide in the cured coating is usually such that, after application to a substrate such as for example a plastic, glass, ceramic material, metal etc. and drying/curing a transparent coating is obtained. The aforesaid ratio is between 1–50 wt. % of nano zinc oxide and 5–90 wt. % of organosilane.

Particularly preferred substrates are transparent substrates.

Application of the zinc oxide-containing, abrasion-resistant layer may be performed by all commonly used methods, including centrifuging, spraying, dipping, flooding, knife application or brush application.

Examples of substrates which may be provided with the multilayer structure according to the invention are plastics, such as for example polyamide, polyethylene, polypropylene, polymethyl methacrylate, polystyrene, polyvinyl cyclohexane and copolymers thereof, acrylonitrile/butadiene/styrene copolymers (ABS), polyvinyl chloride, polycarbonate or blends thereof.

The transparent plastics according to the invention provided with durable UV-resistant, abrasion-resistant coatings may be used, for example, as a replacement for glass for glazing buildings or vehicles (cars, buses, lorries, trains).

EXAMPLES

Scratch Resistant Coating 1:

A scratch-resistant coating was produced from a sol-gel solution consisting of 6.8% cyclo-{SiOCH$_3$[(CH$_2$)$_2$Si(CH$_3$)$_2$OH]}$_4$, 32.1% tetraethyl orthosilicate, 9.6% aluminum 2-butylate, 5.1% acetoacetic ester, 12.6% water, 32.8% 1-methoxy-2-propanol and 1% light stabilizer (Tinuvin 384, Ciba); production is described in EP-A 947 520. Cyclo-{SiOCH$_3$[(CH$_2$)$_2$Si(CH$_3$)$_2$OH]}$_4$ was Cyclo-{SiOCH$_3$[(CH$_2$)$_2$Si(CH$_3$)$_2$OH]}$_4$ is designated hereinafter as D4-silanol.

Scratch-Resistant Coating 2:

10 g of tetraethoxysilane (TEOS) were dissolved in 5.5 g of 1-methoxy-2-propanol and mixed with 1.0 g of 0.1 N p-toluenesulfonic acid with stirring and stirred for a further 30 minutes. A further 1.0 g of 0.1 N p-toluenesulfonic acid was then added and stirred for a further 60 minutes (prehydrolyzate). 3.0 g of aluminium sec.-butylate were dissolved in 1.0 g of 1-methoxy-2-propanol, mixed with 1.6 g of acetoacetic ester with ice cooling and added to the prehydrolyzate at 5° C. Once addition was complete, a further 2.0 g of 0.1 N p-toluenesulfonic acid and 2.4 g of D4-silanol, dissolved in 3.8 g of 1-methoxy-2-propanol, were added and stirred for a further 60 minutes.

Application of the various layers proceeded by means of centrifuging, wherein in each case the maximum speed of rotation (in rpm) and the holding time (in secs) at maximum speed were always indicated.

The abrasion resistance was tested using the Taber Abrader test (ISO 3537; 1000 cycles, 500 g per wheel, CS-10-F abrasive media) and subsequent scattered light determination (ASTM D 1003). The resistance of the coated Makrolon 3103 was determined by QUV-A according to ASTM G 154-97 (cycle 4) and QUV-B weathering according to DIN 53 384. As a measure of the yellowing of the polycarbonate, the yellowness index b* was determined by reflection to DIN 6174. The centrifugation stages were performed in a laboratory centrifuge made by Heraeus (Variofuge RE) with a rotor with a radius of 20.4 cm.

One embodiment of the multilayer coating is as follows:

| Scratch-resistant layer |
| --- |
| ZnO-containing layer |
| Coupling agent (primer) |
| Polycarbonate |

When adequate adhesion of the ZnO-containing layer to polycarbonate is obtained, the coupling agent (primer) may be dispensed with. In addition, it is also possible to use the coupling agent as a binder for the ZnO particles, resulting in the following layer structure:

| Scratch-resistant layer |
| --- |
| Coupling agent + ZnO |
| Polycarbonate |

Example 1

Production of a non-surface-modified nano zinc oxide 590 g of zinc acetate dehydrate were stirred into 2000 g of analytical grade MeOH in a 6 L flask at room temperature. The zinc acetate did not dissolve completely. In parallel therewith, a KOH solution of 296.1 g of analytical grade KOH (86.6%) in 1000 g of analytical grade MeOH was prepared with cooling. 100 ml of the KOH solution were then added to the zinc acetate solution. The previously undissolved part of the zinc acetate then dissolved. The remainder of the KOH solution was then added. A bulky white precipitate arose immediately, which became translucent after approximately 70 mins stirring. The sol was then heated for 25 mins to boiling point, after which the heat source was switched off. After standing over night, a white sediment had formed. After stirring, the sediment was centrifuged off (30 mins, 5000 rpm). 295.9 g of a gel-type residue were obtained, an X-ray diffractometric investigation of which revealed zinc oxide as the sole crystalline phase. The gel-type residue was mixed with 439.3 g of methylene chloride and shaken until the sediment had completely dispersed. The dispersion obtained was translucent and sedimentation-stable for several months.

Example 2

Production of non-surface-modified nano zinc oxide, suitable for surface modification in aqueous dispersion with organosilanes 590 g of zinc acetate dehydrate were suspended in 2000 g of analytical grade MeOH in a 6 L flask and heated to 60° C. The zinc acetate dissolved. In parallel therewith, a KOH solution of 302 g of analytical grade KOH (84.7%) in 1000 g of analytical grade MeOH was prepared with cooling. The KOH solution was then added to the zinc acetate solution, which was at 60° C. A bulky white precipitate arose immediately, which became translucent after approximately 5 mins. Stirring proceeded for a further 80 mins at 60° C. and at the end of the stirring time the batch was milky white. After removal of the heat source, stirring was performed for a further 210 mins. After standing over night, 3243 g were drawn off and replaced by 1000 g of analytical grade MeOH. The sol was then stirred for 20 mins. After 45 mins settling time, a further 768 g of the supernatant were drawn off and replaced by 500 g of analytical grade MeOH. The sol was again stirred for 30 mins and after 40 mins settling time 745 g of the supernatant were again drawn off and replaced by 500 g of analytical grade MeOH. The sol was then stirred for the last time for 30 mins and then centrifuged (30 mins, 5000 rpm) and decanted off. 253.15 g of a gel-type residue were obtained, an X-ray diffractometric investigation of which revealed zinc oxide as the sole crystalline phase.

Example 3

Two-layer structure with non-surface-modified nano zinc oxide from Example 1.

29.5 g of aluminium sec.-butylate were dissolved in 5.9 g of 1-methoxy-2-propanol and 15.5 g of acetoacetic ester were added at room temperature and the solution was heated to 60° C. To this solution 17.3 g of D4-silanol in 31.8 g of 1-methoxy-2-propanol were added dropwise with stirring. After the addition was complete the solution was stirred for a further hour at 60° C. (aluminium/D4 silanol precursor). In parallel therewith, 58.0 g of tetraethoxysilane (TEOS) were dissolved in 50.3 g of n-butanol and mixed with 5.0 g of 0.1 N p-toluenesulfonic acid and stirred for an hour at room temperature (prehydrolyzate). The prehydrolyzate was subsequently mixed with stirring with the aluminium/D4-silanol precursor cooled to room temperature and the solution was stirred for another hour. Then 94.8 g of the nano zinc oxide dispersion produced according to Example 1 (25 wt. % ZnO), 5.0 g of deionized $H_2O$ and an additional 20.7 g of D4-silanol in 38.1 g of 1-methoxy-2-propanol were added and the reaction mixture was stirred for another hour at room temperature.

To improve adhesion, 5 polycarbonate plates (Makrolon, Bayer AG) were then coated with hydroxymethyltriethoxysilane (HMTS, 50 wt. % in ethanol) by spin coating (1000 rpm, 20 secs) and heat-treated for an hour at 130° C. The zinc oxide containing coating solution was subsequently applied by spraying onto the plates pretreated in this way; after curing (1 hour 130° C.), the plates were subjected to QUV-A weathering.

The results of the QUV-A weathering are summarized in Table 1 and illustrated graphically in the Figure.

TABLE 1

| Sample No. | 0 h | 250 h | 500 h | 750 h | 1000 h |
|---|---|---|---|---|---|
| HFC 528-1 | 2.9 | X | X | X | X |
| HFC 528-2 | 2.8 | 1.8 | X | X | X |
| HFC 528-3 | 3.2 | X | 2.1 | X | X |
| HFC 528-4 | 2.5 | X | X | 1.9 | X |
| HFC 528-5 | 2.9 | X | X | X | 2.7 |

Example 4

Surface modification of nano zinc oxide from Example 2 in aqueous dispersion with 3-glycidoxypropyltrimethoxysilane 10 g of the nano zinc oxide gel produced according to Example 2 (containing approx. 55 wt. % ZnO and approx. 40 wt. % MeOH, distilled water, inorg. salts) were mixed with 90 g of distilled water and stirred vigorously until a translucent dispersion was obtained. 10 g of 3-glycidoxypropyltrimethoxysilane were then added to this at 70° C. in an ultrasound bath; the reaction mixture was then heated for a further 30 mins to 70° C. with ultrasound treatment (the reaction vessel was not closed, to allow the resultant methanol to escape). After cooling, a colorless/milky dispersion/emulsion was obtained.

Example 5

Three-layer structure with surface-modified nano zinc oxide (abrasion resistance determined using Taber Abrader test)

To improve adhesion, in each case a first Makrolon plate (10×10 cm) was initially coated with 3-aminopropyltrimethoxysilane (AMMO, 200 rpm, 20 secs) and a second with hydroxymethyl-triethoxysilane (HMTS, 50 wt. % in ethanol, 1000 rpm, 20 secs) and heat-treated for 30 mins at 130° C. The nano zinc oxide dispersion produced according to Example 4 was then applied to both Makrolon plates with a film casting frame (gap height 30 μm) and cured for 30 mins at 130° C. Finally, the scratch-resistant coating 2 was also applied (500 rpm, 20 secs), which was cured for an hour at 80° C. and then for an hour at 130° C. After Taber Abrader scratching, a scattered light increase of 4.0 (AMMO) and 3.5 (HMTS) percentage points was noted.

In comparison thereto, commercially available polycarbonate (e.g. Margard MR 10) with scratch-resistant coating exhibited a scattered light increase of approx. 12 percentage points.

Example 6

Two-layer structure with surface-modified nano zinc oxide (UV resistance determined using QUV-B weathering)

To improve adhesion, a Makrolon plate (7.5×15 cm) was initially coated with hydroxymethyltriethoxysilane (50 wt. % in ethanol, 1000 rpm, 20 secs) and then heat-treated for an hour at 130° C. The nano zinc oxide dispersion produced according to Example 4 was then applied by spin coating (400 rpm, 20 secs) and, after curing for an hour at 130° C., the scratch-resistant coating 2 was finally also applied, this being cured for 1 h at 80° C. and for an hour at 130° C. UV and weather resistance were then tested using QUV-B weathering. The yellowness index b* was used as a measure of the yellowing of the polycarbonate.

In comparison therewith, uncoated polycarbonate (Makrolon 3103, Bayer) exhibited a yellowness value b* of 18.5 after 500 h.

The results of QUV-B weathering are summarized in Table 2.

TABLE 2

| Sample | 0 h | 250 h | 500 h |
|---|---|---|---|
| Makrolon 3103 with nano ZnO | 1.3 | 1.4 | 2.5 |
| Makrolon 3103 | | 11.2 | 18.5 |

Example 7

Three-layer structure with non-surface-modified nano zinc oxide of Example 1 (Scratch resistance determined using Taber Abrader test)

First of all, 29.5 g of aluminium sec.-butylate were dissolved in 5.9 g of 1-methoxy-2-propanol and mixed with 15.5 g of acetoacetic ester and heated. 17.3 g of D4-silanol in 31.8 g of 1-methoxy-2-propanol were added to this solution dropwise with stirring. Once addition was complete, stirring was performed for a further hour at 60° C. (aluminium/D4-silanol precursor).

In parallel therewith, 58.0 g of TEOS were dissolved in 50.3 g of 1-butanol and mixed with 5.0 g of 0.1 N p-toluenesulfonic acid with stirring and stirred for a further 60 minutes (prehydrolyzate). The aluminium/D4-silanol precursor and the prehydrolyzate were then combined and stirred for a further 60 minutes. Finally, 94.8 g of ZnO sol (31 wt. % in methylene chloride from Example 1) and 5.0 g of deionized water were added prior to the addition of a further 20.7 g of D4-silanol in 38.1 g of 1-methoxy-2-propanol. The resultant solution was then stirred for a further 60 minutes before application.

To improve the adhesion of the resultant zinc oxide coating solution to polycarbonate, 5 Makrolon plates (100 mm×100 mm) were coated with hydroxymethyltriethoxysilane (HMTS, 50 wt. % in ethanol) by spin coating (1000 rpm, 20 secs) and heat-treated for an hour at 130° C.

However, other compounds such as for example acrylates, acrylate alkoxysilanes, methacrylates, methacrylate alkoxysilanes, aminosilanes or indeed polyurethanes may be used as coupling agents.

After application of the coupling agent (primer), the zinc oxide coating solution was applied by spin coating (2000 rpm; 20 secs) to the Makrolon plates; this was then heat-cured for 30 minutes at 130° C.

Scratch-resistant coating 1 was then applied by spin coating (800 rpm; 20 secs) and cured for 60 mins at 130° C.

After Taber Abrader scratching, a scattered light increase of 4.6 percentage points was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A plastic article, which is transparent and consists of
   i) a plastic substrate,
   ii) optionally a coupling layer,
   iii) at least one zinc oxide coating, wherein the coating consists essentially of zinc oxide nanoparticles which have a primary particle size of from 1 to 30 nm and which are embedded in an organosilane as a binder resin, and
   iv) one abrasion resistant outer coating containing sol-gel materials.

2. The plastic article of claim 1, wherein the zinc oxide particles are surface-modified with 3-glycidoxypropyltrimethoxysilane.

3. The plastic article of claim 1, wherein the plastic substrate comprises a member selected from the group consisting of polyamide, polyethylene, polypropylene, polymethyl methacrylate, polystyrene, polvinyl cyclohexane and copolymers thereof, acrylonitrile/butadiene/styrene copolymers (ABS), polyvinyl chloride, polycarbonate and blends thereof.

4. The plastic article of claim 3, wherein the zinc oxide particles are surface-modified with 3-glycidoxypropyltrimethoxysilane.

5. A method of protecting a plastic article against UV radiation and against damage comprising:
   (a) applying at least one zinc oxide coating, wherein the coating consists essentially of zinc oxide nanoparticles which have a primary particle size of from 1 to 30 nm and which are embedded in an organosilane as a binder resin, and
   (b) applying an abrasion resistant outer coating containing sol-gel materials.

6. The method of claim 5, wherein a coupling layer is applied to said article before application of said zinc oxide coating.

* * * * *